Figure 1:
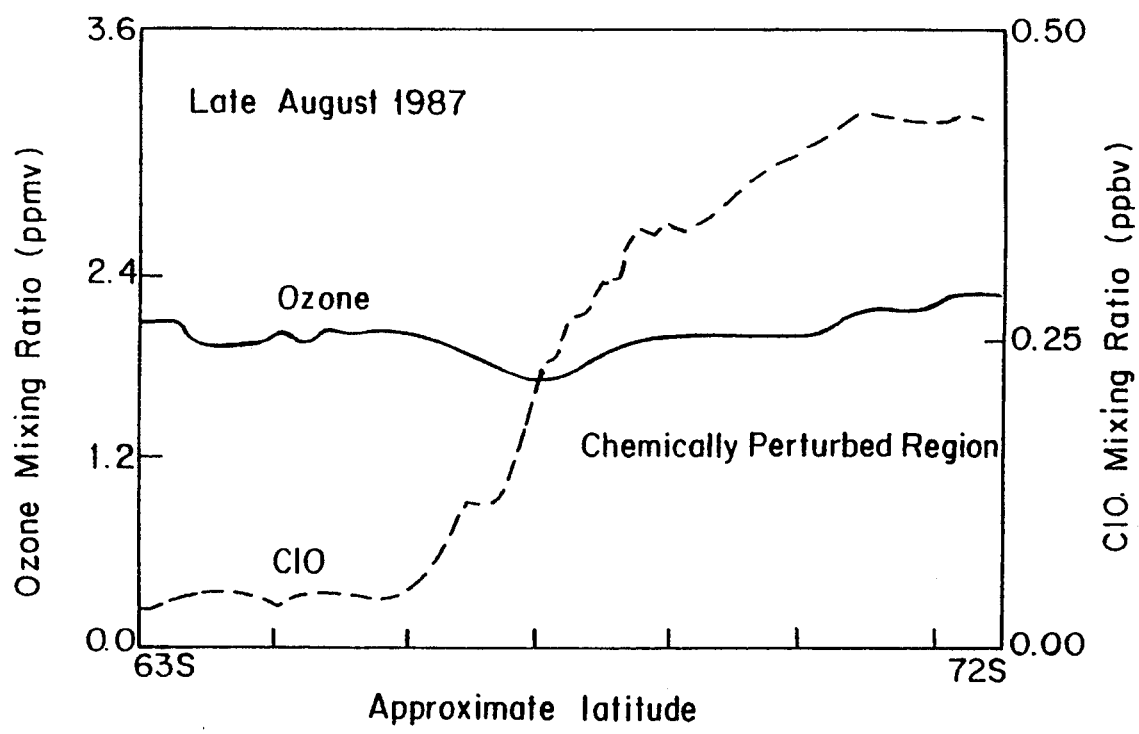

United States Patent [19]

Powers

[11] Patent Number: 5,376,346
[45] Date of Patent: Dec. 27, 1994

[54] METHOD OF REDUCING THE DESTRUCTION OF OZONE IN THE EARTH'S STRATOSPHERE BY THE REMOVAL OF CHLORINE, CHLORINE MONOXIDE RADICALS, AND CATALYTIC AEROSOLS

[76] Inventor: Richard M. Powers, P.O. Box 726, Clifton, Ariz. 85533

[21] Appl. No.: 927,956

[22] Filed: Aug. 11, 1992

[51] Int. Cl.$^5$ .......................... B01D 53/34
[52] U.S. Cl. .................. 423/239.1; 423/241; 423/240 S; 588/248; 239/2.1; 239/14.1
[58] Field of Search ............. 423/239 R, 241, 240 S, 423/210.5; 588/248, 201, 206; 239/2.1, 14.1

[56] References Cited

U.S. PATENT DOCUMENTS

| | | | |
|---|---|---|---|
| 2,408,696 | 10/1946 | Smallwood | 423/449.4 |
| 3,289,409 | 12/1966 | Schirmer | 60/205 |
| 5,147,429 | 9/1992 | Bartholomew et al. | 55/385.3 |

FOREIGN PATENT DOCUMENTS

| | | | |
|---|---|---|---|
| 173640 | 3/1986 | European Pat. Off. | 423/240 S |
| 4074510 | 3/1992 | Japan | 423/220 |

OTHER PUBLICATIONS

Murad et al. Nature 289 N5795 pp. 273-274 (1981) Jan. 1981 Possible role for metals in stratosphere chlorine chemistry.

*Primary Examiner*—Gary P. Straub
*Assistant Examiner*—Stuart L. Hendrickson
*Attorney, Agent, or Firm*—Galgano & Burke

[57] ABSTRACT

By reaction of Cl and ClO radicals with alkaline cations, such as $K_2O_2$, $Na_2O_2$, CaO, CaO $\cdot$ MgO, $Ca(OH)_2$, $CaCO_3$, $(Ca\,Mg)(CO_3)_3$, $Na_2CO_3$, $NaHCO_3$ and $NaHCO_3 \cdot Na_2CO_3 \cdot 2\,H_2O$, these radicals are either bound in ultraviolet radiation stable crystalline inorganic lattices or in high stability alkaline salt solutions. Since most of these salts are hygroscopic, they are able to pick up water vapor from the atmosphere, increase in size, and fall through the stratosphere and troposphere resulting in a faster removal rate than would otherwise occur.

15 Claims, 4 Drawing Sheets

METHOD OF REDUCING THE DESTRUCTION OF OZONE IN THE EARTH'S STRATOSPHERE BY THE REMOVAL OF CHLORINE, CHLORINE MONOXIDE RADICALS, AND CATALYTIC AEROSOLS

The present invention is directed to a method of protecting the earth's atmosphere, and particularly, to a method of arresting the destruction of ozone which forms a protective layer in the earth's stratosphere by the removal of Cl, ClO, their reservoir compounds, and catalytic aerosols from the stratosphere.

BACKGROUND OF THE INVENTION

Loss of protective ozone in the stratosphere in recent years has resulted in increased penetration of harmful ultraviolet radiation to the earth's surface. Such losses have resulted in the creation of a large "ozone hole" in the Antarctic. Generation of a similar ozone hole or holes in the Arctic have also been projected.

Anticipated health effects in regions beneath an ozone hole are expected to include an increase in cataracts, skin cancer and immune system damage in humans, along with similar effects in animals. It is possible that the growth of phytoplankton in the oceans, as well as crop yields on land, may be adversely affected.

Ozone destruction has been accelerated by increased amounts of Cl and ClO radicals originating from man-made chlorofluorocarbons (CFCs) by reactions such as:

$$CF_2Cl_2 + (h\nu) \text{ (ultraviolet radiation)} \rightarrow CF_2Cl + Cl$$

followed by reactions:

$$Cl + O_3 \rightarrow ClO + O_2$$

$$\Delta F_{298} = -40.8 \text{ Kcal/mol}$$

$$\Delta H_{298} = -38.8 \text{ Kcal/mol}$$

and:

$$ClO + O(^3P_2) \rightarrow Cl + O_2$$

$$\Delta F_{298} = -53.6 \text{ Kcal/mol}$$

$$\Delta H_{298} = -54.8 \text{ Kcal/mol}$$

with the overall result:

$$O_3 + O \rightarrow 2O_2$$

$$\Delta F_{298} = -99.4 \text{ Kcal/mol}$$

$$\Delta H_{298} = -93.7 \text{ Kcal/mol}$$

Another pathway to ozone destruction reported by Molina is the heterogeneous process occurring when polar stratospheric ice clouds (PSCs) as subjected to UV irradiation as illustrated by the reaction:

$$HCl + ClONO_2 \xrightarrow{h\nu \;\; ice} HNO_3 \text{ (aq)} + Cl_2$$

in which photochemically active molecular chlorine is liberated from the labile chlorine nitrate reservoir:

$$Cl_2 + (h\nu) \rightarrow 2Cl$$

The Cl radical reaction with ambient ozone produces a ClO radical and destroys ozone in the process.

$$Cl + O_3 \rightarrow ClO + O_2$$

$$\Delta F_{298} = -40.8 \text{ Kcal/mol}$$

ClO then combines with ambient $NO_2$ to reform the $ClONO_2$ sink on ice particles. The process can continue to repeat itself with additional ambient HCl.

$$ClO + NO_2 \xrightarrow{ice} ClONO_2$$

A further heterogeneous catalytic process for ozone destruction may involve sulfate bearing aerosols resulting from fossil fuel combustion, automotive exhaust, or from volcanic activity. It is known, for example, that ozone is decomposed when shaken with powdered glass, or catalytically contacted with metallic silver, platinum, manganese dioxide, lead dioxide, silver, cobalt or iron oxides. Such particulates are released from coal burning power plants and from automobile exhaust using lead or manganese additives in gasoline.

Volcanic action sometimes results in the injection into the stratosphere of magma containing iron or manganese silicates. Such eruptions are often accompanied by a release of sulfur dioxide. When $SO_2$ is eventually oxidized to $SO_3$ (sulfur trioxide) and then hydrolizes to sulfuric acid, it may react to produce the ozone destroying catalysts $Fe+2$ and $Mn+2$.

For example:

$$MnSiO_3 + H_2SO_4(aq) \rightarrow MnSO_4(aq) + H_2SiO_3$$

$$\Delta F_{298} = -19.2 \text{ Kcal/mol}$$

$$H_2O + MnSO_4(aq) + O_3 \rightarrow MnO_2 + H_2SO_4(aq) + O_2$$

$$\Delta F_{298} = -38.9 \text{ Kcal/mol}$$

In summary, it is known that man-made chlorinated organics greatly exceed naturally occurring chlorinated compounds. Under stratospheric ultraviolet irradiation, these compounds, mostly CFCs (chlorofluorocarbons) slowly break up—yielding atomic chlorine fragments, with each chlorine radical being capable of destroying many ozone molecules before chain termination. It has been estimated that the retention times for these compounds in the stratosphere may range up to 100 years with each radical destroying up to 100,000 ozone molecules. Even with immediate cessation of CFC production, the protective ozone layer now in the stratosphere is expected to continue to decrease, allowing more short wavelength ultraviolet radiation to pass to earth where it can damage plant and animal life.

If the current destruction of ozone is not arrested, upper stratospheric losses of 25% may be encountered in the next 75 years, leading to upper stratospheric cooling of as much as 5° C. This could significantly alter stratospheric circulation patterns. Furthermore, the ozone levels in the troposphere would be expected to increase as a consequence, leading to increased surface heating, since ozone acts as a greenhouse gas in the troposphere.

In light of the harm caused by Cl and ClO radicals, it would be beneficial to develop a method of scavenging Cl and ClO radicals and especially the reservoir compounds from which they are continually derived, as well as other ozone destroying compounds, from the stratosphere. It would also be desirable to provide a method for arresting the destruction of protective ozone which does not have an undue adverse environmental impact.

SUMMARY OF INVENTION

To scavenge ozone destroying chlorine, chlorine monoxide radicals and reservoir compounds from which they are derived, one embodiment of the present invention comprises a method wherein these entities are reacted with a finely divided solid phase comprising at least one compound which is chlorine-reactive. The chlorine-reactive compounds are delivered to the stratosphere in a container and are then dispensed from the container into the stratosphere. For example, a high-flying aircraft equipped with one or more storage tanks can be utilized. Alternatively, other methods of delivering active compounds to the stratosphere such as rockets or high-flying balloons may be utilized. In this manner, the Cl/ClO ozone destroying radicals together with the reservoir compounds from which they are generated are bound within an irradiation-stable inorganic crystalline lattice or a solution of a high stability inorganic salt. In either case, the potential for these radicals and reservoir compounds to destroy ozone is substantially reduced.

According to another embodiment of the present invention, compounds which are reactive with other ozone destroying reagents, such as metallic catalysts, are similarly released into the stratosphere to substantially neutralize those reagents.

BRIEF DESCRIPTION OF THE FIGURES

FIGS. 1 and 2 are graphs of the latitude dependence of ozone and chlorine monoxide concentrations before and after, respectively, the onset of an ozone hole adjacent to the Antarctic.

FIG. 3 is a graphical illustration of the altitude dependence of ozone concentration before and after the passage of an ozone hole over McMurdo Station in the Antarctic.

FIG. 4 is a graphical illustration of the altitude dependence of nitrogen and chlorine species representative of northern hemisphere mid-latitudes FIG. 4(*a*) and 4(*b*) show typical mol ratios of nitrogen and chlorine species as functions of altitude measured at mid-latitudes in the northern hemisphere.

FIG. 5 is a schematic diagram of the winter vortex over Antarctica.

DETAILED DESCRIPTION

As stated above, the present invention is directed to methods for reducing the amount of available ozone destroying compounds in the stratosphere. Included within the ozone destroying compounds that are the targets of the methods of the present invention are chlorine, chlorine monoxide, chlorine reservoir compounds and metallic catalysts.

It is known, for example, that crystals of salt(NaCl), on irradiation with U.V. or x-rays, may develop color centers. These result from displacement of cations or anions from their normal locations within the crystal lattice. On heating such a crystal, these color centers are annealed out, restoring the original lattice. Chlorine is not lost from the crystal as a result of this process, i.e.

$$2NaCl \xrightarrow[x]{hV} Na_2Cl + Cl$$

On the other hand, NaCl when heated in the presence of a less volatile acid such as sulfuric acid ($H_2SO_4$) can release the volatile and photochemically active hydrochloric acid (HCl), leaving behind the replacement salt $Na_2SO_4$. Thus $$2NaCl + H_2SO_4 \rightarrow Na_2SO_4 + 2HCl$$

According to one preferred embodiment of the present invention, by the reaction between the Cl/ClO radical and the chlorine-reactive compound, the radicals or reservoir compounds are incorporated either into an irradiation-stable inorganic crystalline lattice or into a solution of a high stability inorganic salt. As used herein, the term "chlorine-reactive" is meant to include elements or compounds that have the ability to bind chlorine, chlorine monoxide radicals and chlorine reservoir compounds to render these entities unavailable for further break down of ozone. This term is also meant to include compounds have the ability to bind bromine and bromine radicals. In any case, the radicals are not expected to be liberated from these species by high intensity ultraviolet radiation. In this manner, the Cl/ClO radical is removed from the photochemical chain reaction that leads to widespread ozone destruction, thereby breaking that chain reaction. Chlorine reservoir compounds are similarly removed from the polar stratospheric ice clouds in a form from which radical release is highly improbable.

The reaction products preferably settle out of the stratosphere and troposphere over time carrying the bound chlorine with them. To insure that these solid reaction products are reasonably benign, reactive cations can advantageously be selected from the principal constituents of sea water; namely sodium, potassium, calcium and magnesium.

According to one embodiment of the present invention, fine particles of sodium peroxide ($Na_2O_2$) in excess oxygen are delivered and released within the lower stratosphere, most preferably above the level of polar stratospheric ice clouds (PSCs). As shown in FIG. 1, the chlorine-reactive compound can be placed at the interface of a chemically perturbed region and an as yet unaffected region, when such an interface has been identified. By dispersing parallel bands of fine $Na_2O_2$ particles in $O_2$ by high flying aircraft, it is expected that chlorine radicals will be trapped within and adjacent to such bands creating a chlorine diffusion gradient that would gradually reduce intervening chlorine levels.

Probable reactions involved, together with approximate free energy and enthalpy values are indicated below:

$$2Cl + Na_2O_2 \rightarrow 2NaCl + O_2$$

$$\Delta F_{298} = -127.2 \text{ Kcal}$$

$$\Delta H_{298} = -132.6 \text{ Kcal}$$

$$2ClO + Na_2O_2 \text{—} 2NaCl + 2O_2$$

$$\Delta F_{298} = -123.5 \text{ Kcal}$$

$$\Delta H_{298} = -123.1 \text{ Kcal}$$

In the presence of stratospheric or tropospheric water vapor, $Na_2O_2$ should react with Cl radicals to form the salt NaCl. For example, the following reaction sequence between $Na_2O_2$ and Cl should break the ozone catalytic destroying reaction sequence indicated previously.

$Na_2O_2 + 2H_2O \rightarrow 2NaOH + H_2O_2$ $2NaOH + 2Cl \rightarrow NaCl + NaOCl + H_2O$ $NaOCl + H_2O_2 \rightarrow NaCl + H_2O + O_2$ with the net reaction:

$Na_2O_2 + 2Cl \rightarrow 2NaCl + O_2$.

Excess oxygen may also be dispensed simultaneously with the $Na_2O_2$ in order to increase the likelihood of regenerating ozone by the usual mechanisms. One reaction scheme that has been proposed for explaining the presence of the ozone layer in the stratosphere is given below:

$O_2 + hV \rightarrow O + O$     a $O + O_2 + M \rightarrow O_3 + M$     b $O_3 + hV \rightarrow O + O_2$     c $O + O_3 \rightarrow 2O_2$     d $O + O + M \rightarrow O_2 + M$     e By providing additional oxygen aloft during dispersion of $Na_2O_2$, the probability of ozone regeneration as a result of reactions a and b is increased (i.e. with $M = O_2$).

Particle sizes of the $Na_2O_2$ dispersion are to be selected either to increase the reaction probability with Cl (persistent particles) or to increase the sedimentation velocity (large particles). A rough estimate of the settling rate of $Na_2O_2$ particles at 20 kilometers altitude above New Zealand in the summer, using the Stokes formula, is given below:

$$V = 2 \frac{ga^2(d_1 - d_2)}{9\eta}$$

where $g = 979.96$ cm/sec$^2$ $a$ = particle diameter (mm)
$Na_2O_2$ density $d_1 = 2.805$ g/cm$^3$
air density $d_2 = 0.000199$ g/cm$^3$ (air temp $-51°$ C.; barometer 44.1 mm)
air viscosity $\eta$ = approx. $143 \times 10^{-6}$ poises

TABLE I

| Particle Diameter 2 (μm) (1 × 10⁻⁶ m) | Velocity of Fall cm/sec | V (km/day) |
|---|---|---|
| 1 | .043 | .037 |
| 5 | 1.1 | .86 |
| 10 | 4.3 | 3.7 |
| 20 | 17.1 | 14.7 |
| 30 | 38.4 | 33 |

In order to produce a persistent $Na_2O_2$ particle in the size range of Aitken nuclei (0.01–1 μm), according to one embodiment of the present invention, fine molten sodium sprays are burned in two stage burners employing excess oxygen. The excess oxygen serves to reduce the burner exit temperature to 300° C. or less thereby producing mostly $Na_2O_2$ rather than $Na_2O$ fume. For this purpose aircraft can be provided with a liquid oxygen source and a heat exchanger for producing gaseous oxygen. The sodium is advantageously hermetically sealed in stainless steel containers. Provision is made for melting and delivering molten sodium (at 100° C. or more) to fine spray nozzles within the burners under inert gas pressure to produce the desired particle size as determined by one skilled in the art of spray production.

A concentric staged burner can be employed for sodium combustion. In the inner burner sleeve, sodium monoxide is formed by the reaction:

$2Na + \frac{1}{2}O_2 \rightarrow Na_2O$ $\Delta F_{298} = -89.7$ Kcal/mol $Na_2O$ $\Delta H_{298} = -99$ Kcal/mol $Na_2O$ followed by further reaction with excess oxygen to form sodium peroxide by the reaction:

$Na_2O + 3/2\, O_2 \xrightarrow{300°} Na_2O_2 + O_2$ $\Delta F_{298} = -17.3$ Kcal/mol $Na_2O_2$
$\Delta H_{298} = -23.1$ Kcal/mol $Na_2O_2$ The inner first stage burner section is preferably provided with a high frequency spark igniter for liquid sodium (or NaK). An extended outer second stage is then utilized to supply excess oxygen to carry out the further oxidation of sodium at the lower temperature.

For dispensing larger particulate $Na_2O_2$ (1–5000 μm), $Na_2O_2$ powder or granules may be dispensed from a fluidized bed feeder. For example, the fluidized bed feeder disclosed in U.S. Pat. No. 4,693,189 to Powers, which is hereby incorporated by reference, may be utilized. Those skilled in the art will appreciate that other methods of dispensing the active compounds of the present invention may also be utilized without departing from the scope of the present invention.

If aircraft are to be utilized, they can be provided with liquid oxygen tanks and heat exchangers for oxygen vaporization. The heat exchangers may conveniently utilize the aircraft engine as a heat source. To prevent hydrolysis of the $Na_2O_2$, stainless steel containers joined to fluidized bed feeders, such as that described in the above-referenced patent to Powers, with other associated controls that will be readily appreciated by those skilled in the art, such as oxygen pressure regulators and bed level controllers, may be used. While $Na_2O_2$ appears to be a most promising chlorine-reactive compound for the removal of Cl and ClO from a reactivity standpoint, it is relatively expensive and requires appropriate handling procedures.

When $Na_2O_2$ is released from aircraft and reacts according to the reaction sequences set forth above, because of its deliquescent properties, the $Na_2O_2$ particles containing NaCl will tend to grow in size, picking up moisture and eventually producing large enough drops of solution to settle out of the stratosphere and troposphere. Concentrated NaOH droplets containing NaCl then have the opportunity to react with ambient carbon dioxide on the way to the earth's surface to form $Na_2CO_3$ or $NaHCO_3$, ecologically benign compounds.

Larger falling $Na_2O_2$ particles coming in contact with polar stratospheric ice clouds also have an opportunity to react with the reservoir compounds chlorine nitrate and hydrochloric acid contained in those clouds as follows:

$$ClONO_2 + Na_2O_2 \rightarrow NaCl + NaNO_3 + O_2$$

The resulting heat release and electrolyte content will facilitate localized ice melting, drop formation, and drop growth. Consequently, rain washout should be accelerated.

Reaction of $Na_2O_2$ with additional components of the polar ice clouds (e.g. HCl, $HNO_3$, $H_2SO_4$ and $FeSO_4$) according one or more of the following reactions is also likely, similarly accompanied by melting and rain washout as well.

$$2\ HCl + Na_2O_2 \longrightarrow 2\ NaCl + H_2O + \tfrac{1}{2}\ O_2 \quad \Delta F_{298} = -87.8\ Kcal$$

$$2\ HNO_3 + Na_2O_2 \longrightarrow 2\ NaNO_3 + H_2O + \tfrac{1}{2}\ O_2 \quad \Delta F_{298} = -86.5\ Kcal$$

$$H_2SO_4 + Na_2O_2 \longrightarrow Na_2SO_4 + H_2O + \tfrac{1}{2}\ O_2 \quad \Delta F_{298} = -75.3\ Kcal$$

$$FeSO_4 + Na_2O_2 + 3/2\ H_2O \longrightarrow Fe(OH)_3 + Na_2SO_4 + \tfrac{1}{2}\ O_2 \quad \Delta F_{298} = -81.1\ Kcal$$

As an alternative to or in addition to the use of $Na_2O_2$, other reactants may also be utilized. For example, lime or dolomitic lime (CaO, CaO . MgO), limestone or marble ($CaCO_3$), trona ($NaHCO_3$ . $Na_2CO_3$ . $2H_2O$), dolomite $(CaMg)(CO_3)_2$, or $Na_2CO_3$ or $NaHCO_3$ may be used alone or in combination with $Na_2O_2$ or with each other.

Finely divided high surface area $CaCO_3$ may be produced, for example, by autogenous wet grinding of marble, centrifugal classification to produce the desired particle size, and drying followed by fluidizing in air or preferably oxygen for high altitude distribution.

The reaction of $CaCO_3$ with stratospheric chlorine radicals is assumed to follow the course:

$$CaCO_3+2Cl \rightarrow CaClOCl+CO_2$$

Subsequent oxidation of the reaction product to the more stable $CaCl_2$ may occur by interactions of the particles or the CaClOCl containing water droplets with $O_3$, with excited oxygen, e.g. $O(^3P_2)$, or on standing in light.

$$CaClOCl + O_3 \longrightarrow CaCl_2 + 2\ O_2$$

or $$CaClOCl + O \longrightarrow CaCl_2 + O_2$$

or $$CaClOCl \xrightarrow{hV} + \tfrac{1}{2}\ O_2 + CaCl_2$$

Since the products are hygroscopic, they can pick up water (even from unsaturated atmospheres), increase in diameter and fall out of the stratosphere. Therefore, even though this reaction sequence destroys some ozone, it is preferable to leaving the chlorine radicals in a chain reaction that would otherwise destroy up to 100,000 ozone molecules per ClO radical. If geography, wind, and weather are carefully monitored, these products can be deposited in the ocean where they should have negligible ecological impact.

Larger sized particles of $CaCO_3$ (10–5000 $\mu$m) also fluidized for distribution in oxygen or air, on settling into the polar stratospheric ice clouds, have the opportunity to react with acids and reservoir compounds in those clouds according to the following:

$$CaCO_3 + H_2SO_4 \longrightarrow CaSO_4 + CO_2 + H_2O \quad \Delta F_{298} = -11.4\ Kcal$$

$$CaCO_3 + 2\ HNO_3 \longrightarrow Ca(NO_3)_2 + CO_2 + H_2O \quad \Delta F_{298} = -11.4\ Kcal$$

$$CaCO_3 + 2\ HCl \longrightarrow CaCl_2 + CO_2 + H_2O \quad \Delta F_{298} = -11.4\ Kcal$$

$$3\ CaCO_3 + \underbrace{2\ ClONO_2 + 2\ HCl}_{\text{(reservoir compounds)}} \longrightarrow Ca(NO_3)_2 + 2\ CaCl(OCl) + 3\ CO_2 + H_2O$$

$$CaCO_3 + FeSO_4 \longrightarrow CaSO_4 + FeCO_3 \quad \Delta F_{298} = -8.7\ Kcal$$

$$4\ FeCO_3 + O_2 + 6\ H_2O \longrightarrow 4\ Fe(OH)_3 + 4\ CO_2. \quad \Delta F_{298} = -57.5\ Kcal$$

The resulting hygroscopic calcium compounds should similarly melt ice, increase in diameter and fall to the ocean or ground with minimal ecological impact, thus removing acids, reservoir compounds of chlorine (HCl and $ClONO_3$) and metallic catalysts from ozone destruction. As an incidental benefit, the addition of soluble nitrate salts and iron to the oceans may be expected to supply additional nutrients for plankton growth.

Reactions of trona ($NaHCO_3$ . $Na_2CO_3$. $2H_2O$) with chlorine radicals in the stratosphere and with the polar stratospheric ice clouds is expected to follow a similar course to that set forth above for $CaCO_3$. Trona has the economic advantage that it can be mined at low cost. If not sufficiently reactive, such reactivity might be increased along with surface area by careful low temperature or vacuum dehydration.

Finely pulverized trona, dried or dehydrated, may be fluidized in oxygen (or air) in the same fluidized bed feeder as was employed for $Na_2O_2$ but without the burdensome handling procedures required for the latter. Reaction of finely powdered trona with stratospheric Cl or ClO radicals is expected to follow the following reaction sequence:

$$2(NaHCO_3 . Na_2CO_3 . 2H_2O)+6Cl \rightarrow 3NaCl+3NaOCl+4CO_2+5H_2O$$

$$\Delta F_{298}=-168.8\ Kcal$$

$$\Delta H_{298}=-167.8\ Kcal$$

and $2(NaHCO_3 . Na_2CO_3 . 2H_2O)+6ClO \rightarrow 3NaCl+3NaOCl+4CO_2+5H_2O+3O_2$ $$\Delta F_{298}=-158\ Kcal$$

$$\Delta H_{298}=-139\ Kcal$$

The above reactions, while fixing one half of the chlorine in radiation stable NaCl form, leave NaOCl unoxidized. This product may react with ambient ozone, atomic oxygen or light according to the reactions:

$$NaOCl + O_3 \rightarrow 2O_2 + NaCl$$

$$\Delta F_{298} = -61.6 \text{ Kcal}$$

$$NaOCl + O(^3P_2) \rightarrow O_2 + NaCl$$

$$\Delta F_{298} = -78 \text{ Kcal}$$

$$2NaOCl + h\nu \rightarrow 2NaCl + O_2$$

Reaction of inexpensive trona with polar stratospheric ice clouds (PSCs) should be similar to that for $CaCO_3$, but forming sodium chloride, hypochlorite, sulfate and nitrate instead. Since most of these salts are hygroscopic, they should melt ice, grow in size, agglomerate and drop out of the (region of high UV levels in the) stratosphere and through the troposphere as neutral rain containing fixed chlorine. With proper planning, the bulk of these salts will preferably end up in the oceans.

$$2(NaHCO_3 \cdot Na_2CO_3 \cdot 2H_2O) + 3H_2SO_4 \rightarrow 3Na_2SO_4 + 4CO_2 + 8H_2O$$

$$\Delta F_{298} \approx -104 \text{ Kcal}$$

$$\Delta H_{298} \approx -87 \text{ Kcal}$$

$$(NaHCO_3 \cdot Na_2CO_3 \cdot 2H_2O) + 3HNO_3 \rightarrow 3NaNO_3 + 2CO_2 + 4H_2O$$

$$\Delta F_{298} \approx -33 \text{ Kcal}$$

$$\Delta H_{298} \approx -9 \text{ Kcal}$$

$$2(NaHCO_3 \cdot Na_2CO_3 \cdot 2H_2O) + 2ClONO_2 + 2HCl \rightarrow 2NaCl + 2NaOCl + 6H_2O + 4CO_2 + 2NaNO_3$$

Of the carbon dioxide released in the polar stratospheric clouds by $CaCO_3$ or trona, some of it is expected to dissolve in the melted ice along with the salts, and be carried down into the ocean. Carbon dioxide gas released at heights above 20 kilometers usually leads to atmospheric cooling since at this altitude more radiation is leaked to space than returned to earth.

A reagent that does not release carbon dioxide on reacting with chlorine radicals in the stratosphere or with constituents of PSCs, while at the same time producing more heat of reaction for ice melting, is lime (CaO). Thus, in the stratosphere:

$$CaO + 2Cl \rightarrow CaCl(OCl)$$

$$\Delta H_{298} = -85 \text{ Kcal}$$

The reaction product CaCl(OCl) decomposes on standing by the reaction:

$$CaCl(OCl) \rightarrow CaCl_2 + \tfrac{1}{2}O_2$$

$$\Delta H_{298} \approx -11.8 \text{ Kcal}$$

The presumed reaction of lime with the ClO radical is given by the equation:

$$CaO + 2ClO \rightarrow CaCl_2 + O_2$$

$$\Delta F_{298} = -81.3 \text{ Kcal}$$

$$\Delta H_{298} = -87 \text{ Kcal}$$

The resulting salt, $CaCl_2$ in both cases, is hygroscopic, picking up water avidly from unsaturated atmospheres to form larger, more readily settled particles. Reaction of lime with other constituents of highly acidic polar stratospheric ice clouds should also follow equations such as:

$$CaO + H_2SO_4 \longrightarrow CaSO_4 + H_2O$$
$$\Delta F_{298} = -56.7 \text{ Kcal}$$
$$\Delta H_{298} = -46.3 \text{ Kcal}$$

$$CaO + 2 HNO_3 \longrightarrow Ca(NO_3)_2 + H_2O$$
$$\Delta F_{298} = -44.6 \text{ Kcal}$$
$$\Delta H_{298} = -46.3 \text{ Kcal}$$

$$3 CaO + 2 ClONO_2 + 2 HCl \longrightarrow$$
(chlorine reservoir compounds)
$$Ca(NO_3)_2 + 2 CaCl(OCl) + H_2O$$

Fine dry lime fluidized in oxygen or air and dispensed from high flying aircraft should react not only with lower stratospheric chlorine radicals, but subsequently with PSCs causing rain-out of chlorine reservoir compounds as well as catalytic aerosols.

Hydrated lime ($Ca(OH)_2$) is also a potential compound for chlorine radical removal. Less heat release on reaction makes it a less effective reagent for treating PSCs. It may, however, be dispersed in the same manner as dry lime.

Figures

Figure 2:
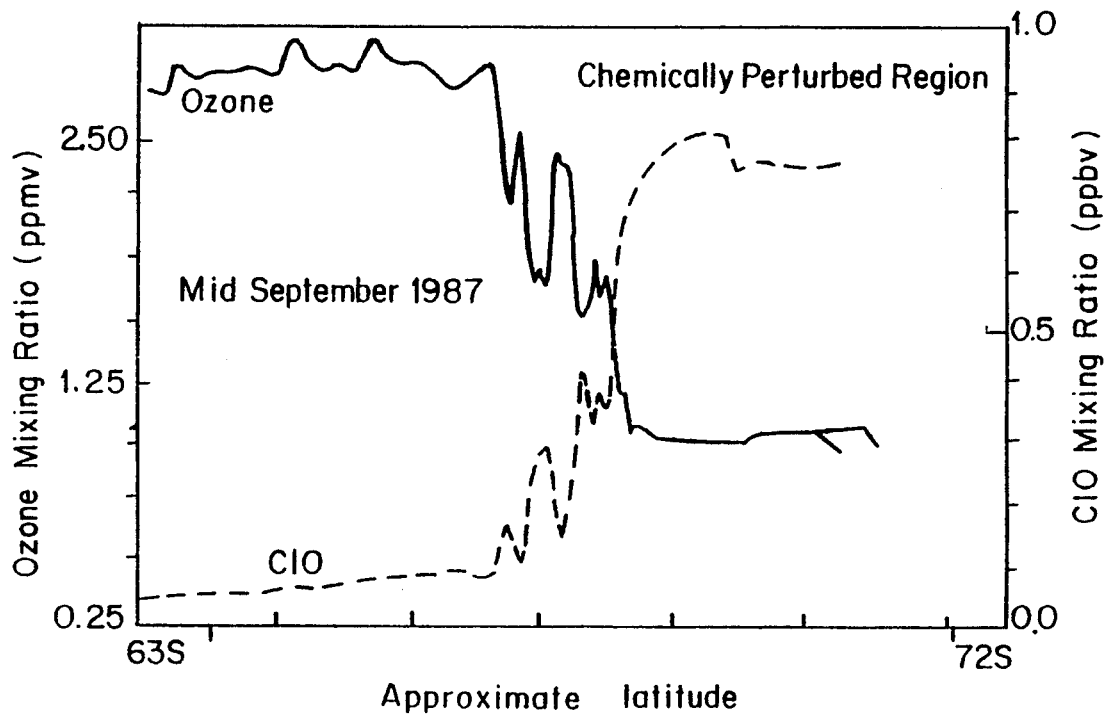

FIGS. 1 and 2 show cross sections of the ozone hole near latitude 65° S. If reagents such as $Na_2O_2$, $CaCO_3$, CaO or trona are delivered to this region to react with stratospheric ClO, then fall into the polar stratospheric ice clouds to convert acid constituents and chlorine reservoir compounds (HCl and $ClONO_2$) to salts, expansion of the hole and ClO migration to lower latitudes could be arrested. Since 65° S latitude is largely outside of the Antarctic continent, the bulk of the reaction products NaCl, $NaNO_3$, $CaCl_2$, $CaSO_4$, etc. should end up in the ocean.

Figure 3:
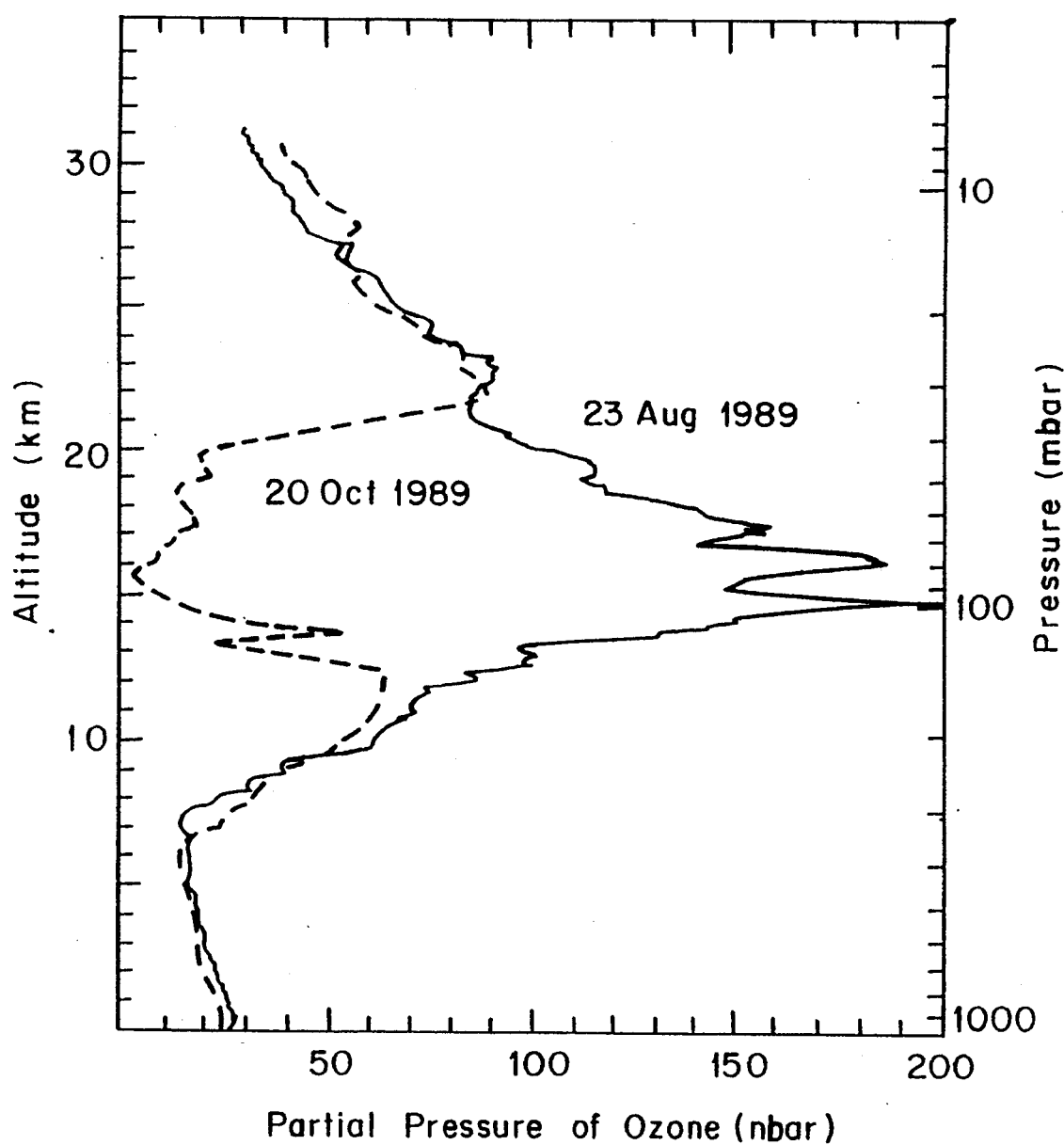
Figure 4B:
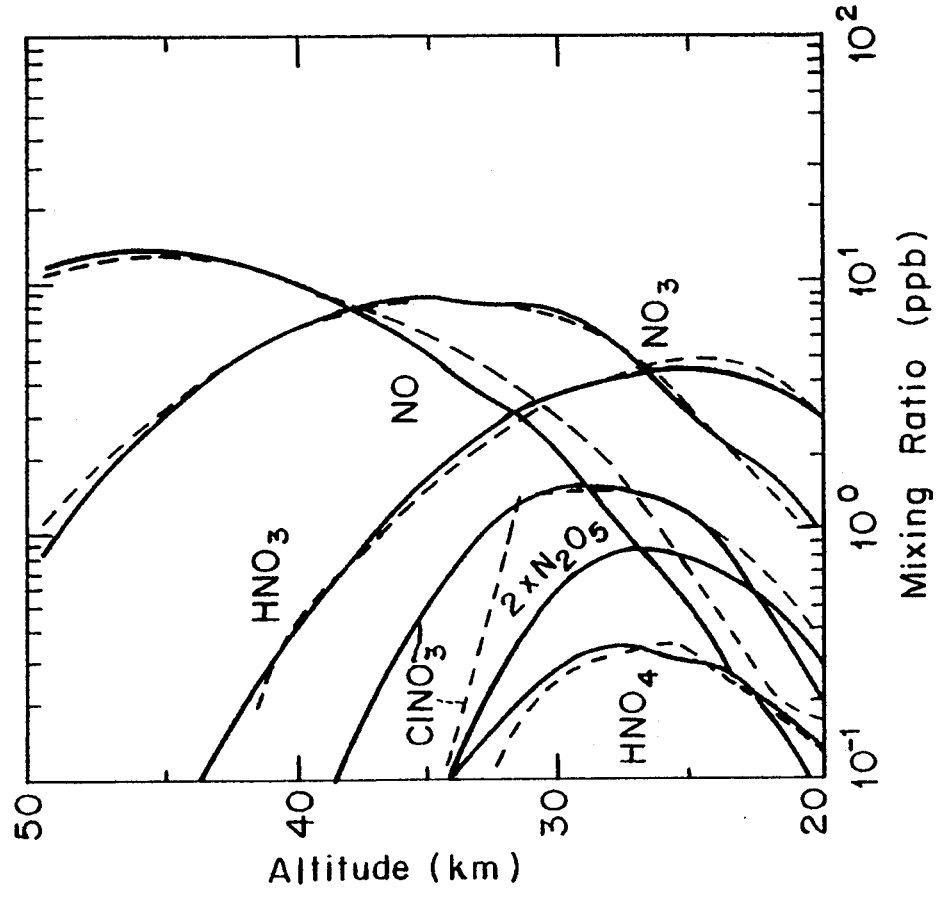
Figure 4A:
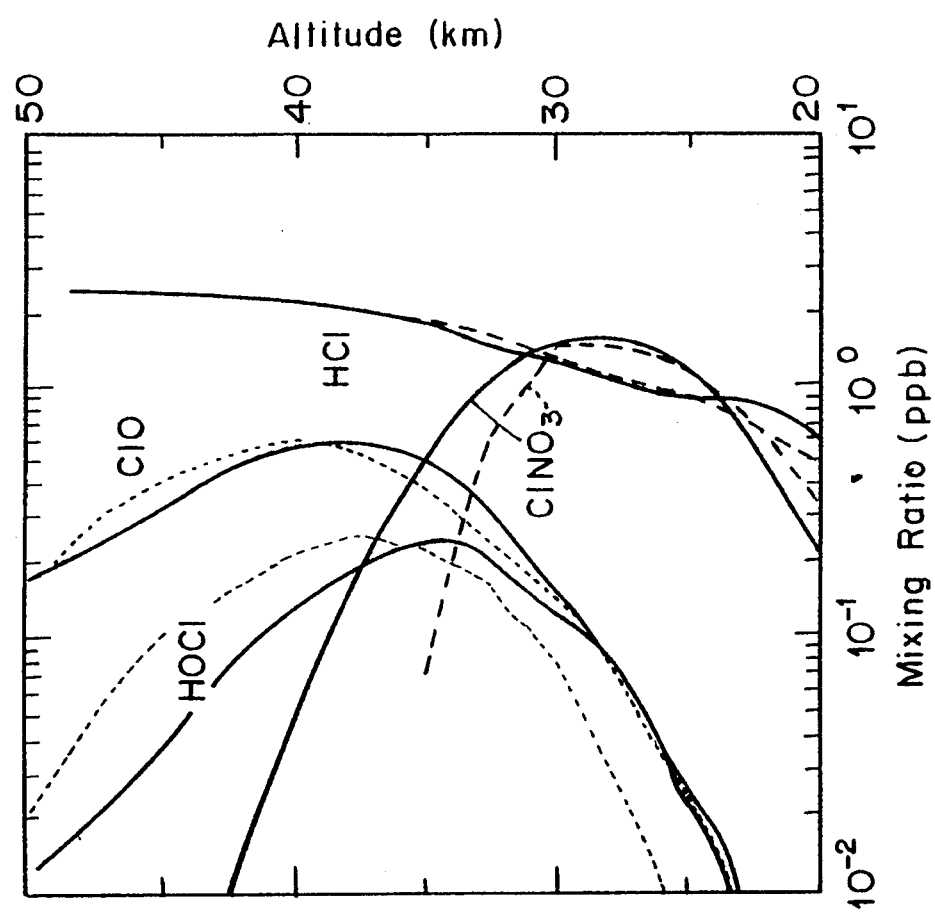
Figure 5:
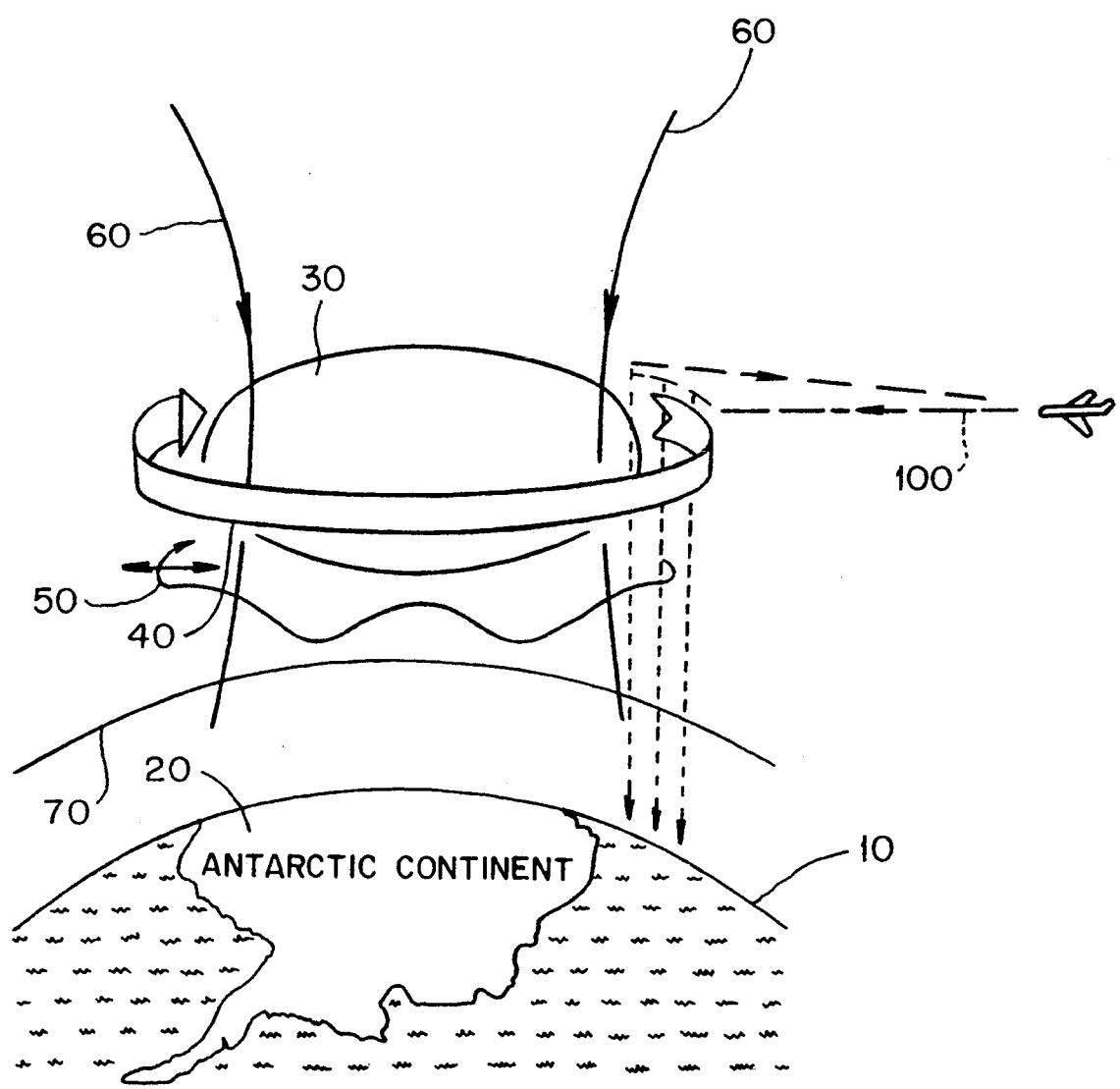

FIG. 3 shows an altitude profile taken before and after passage of an ozone hole over McMurdo station in the Antarctic. It shows the striking drop in ozone partial pressure beginning at 14 kilometers and ending at 22 kilometers that occurred between Aug. 23rd and Oct. 20th, 1989. This seems to indicate that the bulk of ozone destruction is taking place between these altitudes. At 15 kilometers, an ozone reduction of 98% is observed. To obtain a rough estimate of this most active destruction volume between 10 and 20 kilometers height and between latitudes 70° and 90°, using a polar radius of 6356.911 kilometers, the volume between 10 and 20 kilometers above latitude 70° can be determined using equations for hemisphere and sector volume:

$$V = \tfrac{2}{3}\Pi r_1^3 \tfrac{2}{3}\Pi r_2 h$$

where $h = (r+10) \sin 70°$ and $(r+20) \sin 70°$ $$V_{20Km} - V_{10Km} = 0.15385 \times 10^9 Km^3$$

In this volume, an assumed mixing ratio, mol fraction, or volume fraction of ClO of $1.5 \times 10^{-9}$ leads to a ClO volume of $1.5 \times 10^{-9} \times 0.15385 \times 10^9$ Km$^3$ or 0.230775 Km$^3$ ClO, using the perfect gas laws as an approximation.

Average temperature between 10 and
20 Km $-49.170$ C.(224° K.)
R = .082057 lit atm/°K. g mol
Average pressure by graphical averaging
P = 106.22 mm $\times$ 1atm/760 mm = .1398 atm $$V = .230775 \text{ Km}^3 \text{ ClO} \times \frac{(10^3 M)^3}{\text{Km}} \times \frac{10^3 \text{ liters}}{M^3}$$

$$= 230.775 \times 10^9 \text{ lit}$$

$$N = \frac{PV}{RT} \quad \frac{(.13977 \text{ atm})(230.775 \times 10^9 \text{ lit})}{.082057 \text{ lit atm/°K. (224° K.)}}$$

$$N = 1.7548 \times 10^9 \text{g mols ClO}$$

Minimum Na$_2$O$_2$ requirements for reaction with ClO gas in antarctic between 10–20 kilometers altitude and south of latitude 70° to the south pole:

$$Na_2O_2 + 2ClO \rightarrow 2\ NaCl + O_2$$

$$1.75 \times 10^9 \text{ mols ClO} \times \frac{Na_2O_2}{2\ ClO} \times \frac{78 \text{ g } Na_2O_2}{\text{mol } Na_2O_2} =$$

$$68.4 \times 10^9 \text{ g} \frac{\text{Kg}}{10^3\text{g}} = 68.4 \times 10^6 \text{ Kg } Na_2O_2 =$$

or $$68.4 \times 10^6 \text{ Kg} \times \frac{2.2046\ \#}{\text{Kg}} = 150 \times 10^6\ \#\ Na_2O_2$$

or 75,000 tons $Na_2O_2$.

If produced by combustion of Na, $$2Na + O_2 + O_2 \text{ (excess)} \rightarrow O_2 + Na_2O_2$$

it would require 45,000 tons of sodium and if employing 100% excess of oxygen=31,000 tons of oxygen.

An attempt to treat such a continent wide area in the manner above, however, using high flying aircraft appears impractical in light of the numbers of aircraft required, the inhospitable antarctic weather and the knowledge that the process would have to be carried out repeatedly to keep up with Cl and ClO radicals that would continue to be released from reservoir compounds within the PSC's.

Instead, following chemical analysis of the composition of the periphery of the PSC's and estimation of the specific cloud volume, it should be practical to employ adequate quantities of reagents to locally neutralize the polar stratospheric ice cloud in the chemically perturbed interfacial region and to prevent chlorine radical release and migration to lower latitudes there. At the edge of an untreated PSC cloud, the reaction $$HCl + ClONO_2 \xrightarrow[\text{ice}]{hV} Cl_2 + HNO_3$$

can take place.

A similar driving force for chlorine gas release would not be expected after localized PSC neutralization. Thus for a reaction such as $$\underset{\text{reservoir compounds}}{\underline{ClONO_2 + HCl}} + \underset{\text{alkaline reagents}}{\underline{Na_2CO_3 + Na_2O_2}} \longrightarrow$$

$$2NaCl + NaNO_3 + NaHCO_3 + O_2 \xrightarrow[\text{x}]{hV} Cl_2 \text{ or } Cl \text{ or } ClO$$

it would be unlikely that the resulting cold salt solutions would give rise to significant amounts of free chlorine or chlorine radicals even when subjected to a high level of UV radiation. Rainout of these salts would further reduce this possibility by shielding from UV as they drop to lower altitudes and eventually into the ocean.

Similar smaller stratospheric ice clouds in the northern hemisphere or elsewhere could be equally well treated. If a point were made of reacting such clouds containing high concentrations of reservoir compounds when they are over ocean regions, little ecological harm would be expected to result, unless of course such clouds contained significant amounts of radioactive matter.

ClO may not be the only significant contributor to ozone loss in the northern hemisphere where iron and manganese salts from smelters' and power plants' fly ash, and lead and manganese derived from gasoline additives, provide potent catalysts for destroying ozone, especially in highly acid environments. These catalysts may likewise be precipitated from the lower stratosphere using the same neutralizing reagents. Furthermore, the methods of the present invention can be expected to reduce the amount of acid rain by removing acids trapped in clouds below the stratosphere.

FIG. 4(*a*) and 4(*b*) show typical mol ratios of nitrogen and chlorine species as functions of altitude measured at mid-latitudes in the northern hemisphere. While mol ratios are somewhat higher at higher altitudes, only small concentrations of ClO and HCl are actually present because of the rapid drop of pressure and air density with altitude. Consequently, the region between 10 kilometers and 20 kilometers has much more effect on ozone loss. Therefore, the methods of the present invention preferably release the chlorine-reactive compounds in or above these altitudes.

Even more significant for prevention of ozone destruction by chlorine catalytic agents is the removal of chlorine reservoir compounds from polar stratospheric ice clouds. These will continue to feed photochemically active chlorine into the stratosphere until the reservoir compounds are destroyed. The best hope for such removal would seem to be to deploy and disperse alkaline neutralization agents from above the periphery of the PSC's and within the chemically perturbed region. FIG. 5 is a schematic diagram of the winter vortex over Antarctica. As illustrated, the cold core of the Antarctic vortex 30 positioned over the Antarctic continent 20 and above the tropopause 70 generates strong westerly winds 40 in the mid-to-low part of the stratosphere. As reported in Wayne, R. P., *Chemistry of Atmospheres,* 2nd edition, p.184, Clarendon Press—Oxford, 1991, the winds are so strong that the cold core is practically isolated from the rest of the atmosphere, and acts as a reaction vessel in which the constituents may become chemically preconditioned during the long polar night. A relatively slow, downwardly directed, radiatively driven circulation 60 is also established. As the periphery of the PSC's is the region where most mixing occurs (as designated by arrow 50) between the chemically perturbed regions and the unperturbed regions, one preferred embodiment of the present invention deposits chlorine-reactive compounds at the periphery of these clouds following a flight path 100. Furthermore, such a flight path offers the additional advantage that the rain washout by-products will fall into the ocean 10.

By neutralizing these acidic reservoir compounds and producing neutral salt solutions, melting the edges of the PSC's with consequent rainout of the resulting salts should occur. Consequently, release of catalytically active chlorine compounds Cl and ClO should be expected to be reduced in these treated regions.

I claim:

1. A method for reducing the destruction of ozone in the atmosphere comprising the steps of:
    delivering at least one compound selected from the group consisting of sodium peroxide, potassium peroxide and mixtures thereof to the stratosphere by placing said compound in an aircraft and flying said aircraft to the stratosphere,
    releasing said compound to the stratosphere whereby said compound reacts with chlorine in the stratosphere.

2. A method for reducing the destruction of ozone in the stratosphere according to claim 1 wherein said compound is released at an altitude of about 10–40 km.

3. A method for reducing the destruction of ozone in the stratosphere according to claim 1 wherein said compound is released at an altitude of about 10–25 km.

4. A method for reducing the destruction of ozone in the stratosphere according to claim 1 wherein said compound has a particle size of about 0.01–5000 microns ($\mu$m).

5. A method for reducing the destruction of ozone in the stratosphere according to claim 1 wherein said compound has a particle size of about 1–500 microns ($\mu$m).

6. A method for reducing the destruction of ozone in the stratosphere according to claim 1 wherein said compound has a particle size of about 0.01–1 microns ($\mu$m).

7. A method for reducing the destruction of ozone in the stratosphere according to claim 1 wherein said releasing step comprises releasing said compound which comprises at least two different particle sizes.

8. A method for reducing the destruction of ozone in the stratosphere according to claim 1 further comprising the step of releasing oxygen ($O_2$) with said compound.

9. A method for reducing the destruction of ozone in the stratosphere according to claim 1 wherein said contained quantity of said at least one compound is delivered to polar stratospheric ice clouds.

10. A method for reducing the destruction of ozone in the stratosphere comprising the steps of:
    placing at least one compound selected from the group consisting of sodium peroxide, potassium peroxide and mixtures thereof in a container wherein said container is attached to an aircraft;
    transporting said container to the stratosphere; and
    releasing said compound from said container into said stratosphere.

11. A method for reducing the destruction of ozone in the stratosphere according to claim 10 wherein said compound is dispensed from a fluidized bed feeder.

12. A method for reducing the destruction of ozone in the stratosphere according to claim 11 wherein said compound comprises sodium peroxide ($Na_2O_2$) and wherein said container comprises a stainless steel liner.

13. A method for reducing the destruction of ozone in the stratosphere according to claim 11 wherein said fluidized bed feeder is supplied with ambient air fed to said fluidized bed feeder by at least one air compressor located in said aircraft.

14. A method for reducing the destruction of ozone in the stratosphere according to claim 10 further comprising the step of releasing oxygen ($O_2$) with said compound.

15. A method for the removal of the labile photochemically reactive reservoir compounds chlorine nitrate ($ClONO_2$) and hydrochloric acid (HCl) from the periphery of polar stratospheric clouds (PSC's) which contain ice particles comprising the steps of:
    treating said PSC's with at least one compound selected from the group consisting of sodium peroxide, potassium peroxide and mixtures thereof and
    converting said reservoir compounds to neutral salts which are capable of melting ice particles in the PSC's, and forming droplets of a size sufficient to fall out of said stratosphere.

* * * * *